July 17, 1962   J. H. RAWLINGS   3,044,075
PROTECTIVE DEVICE
Filed March 28, 1960
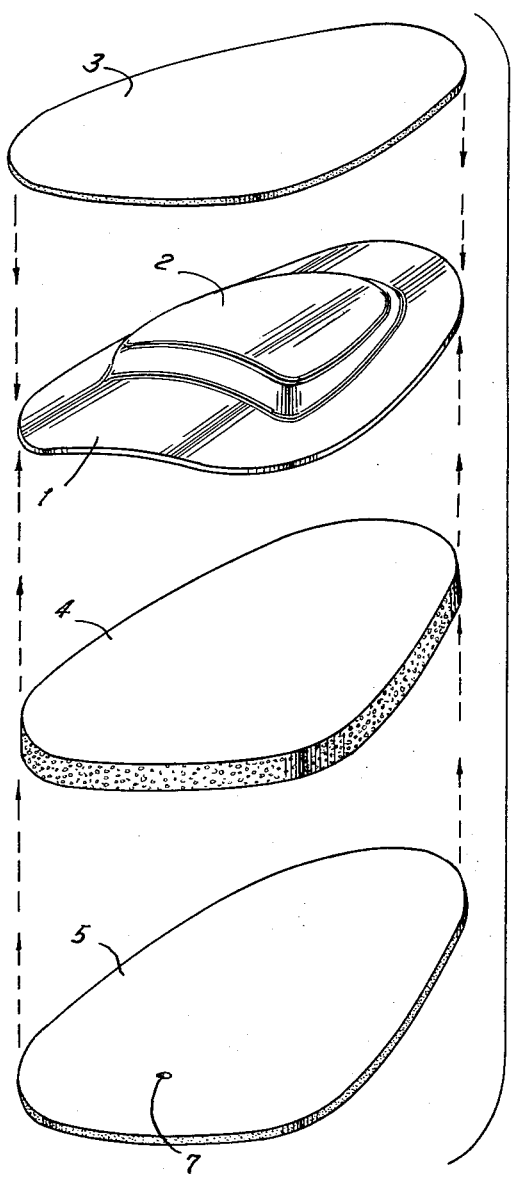
Fig. I
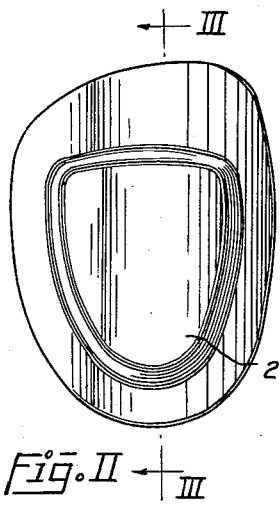
Fig. II
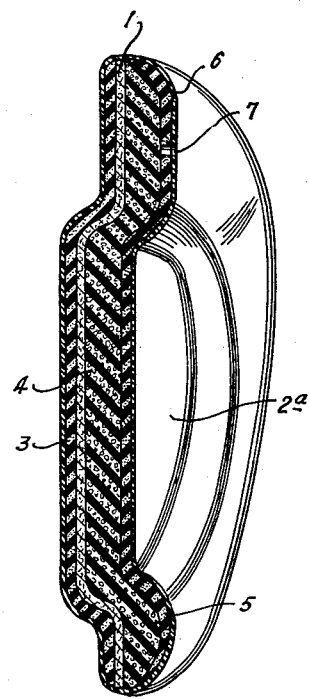
Fig. III
INVENTOR
John H. Rawlings
BY Howard E. Moore
ATTORNEY

United States Patent Office 3,044,075
Patented July 17, 1962

3,044,075
PROTECTIVE DEVICE
John H. Rawlings, Duncanville, Tex., assignor to City Linen, Inc., Dallas, Tex., a corporation of Texas
Filed Mar. 28, 1960, Ser. No. 18,090
5 Claims. (Cl. 2—22)

This invention is concerned with a protective device for protecting the body of the wearer at impact points. It is particularly intended as a protective pad for incorporation in athletic equipment, such as football equipment, to protect the body of the athlete at anticipated impact points such as the thigh, shoulder, hips, etc.

However, it will be understood that the protective device would have application in other forms of equipment where impact absorption is desired.

It is particularly related to the type of protective pad disclosed in U.S. Patent No. 2,785,407 issued to Leo E. Reeder on March 19, 1957.

As disclosed in the Reeder patent, a pad is made of a core or stiffener element molded in a desired shape which may be made of plastic composition of rigid form. The core is surrounded by layers of foam vinyl plastic on each side thereof, which are brought together at the edges about the core and cemented together and the entire pad is covered with a vinyl resin coating to render same moisture and perspiration resistant.

The foam vinyl plastic material disclosed in the Reeder patent is of the unicellular, closed cell type; that is, the cells therein do not intercommunicate. Such a pad has advantage in that the plastic material is of the "slow memory" type and slow rebound, so as to absorb impact blows.

Previous protective pads of the type disclosed herein, including that disclosed in the Reeder patent, incorporated the principle of impact absorption solely by deformation of resilient material. Moreover the Reeder pad utilizes reinforced closed cellular plastic material which becomes hard and relatively unpliant at low temperatures, lessening or destroying the shock absorbing capabilities of the pad at increasingly lower temperatures.

The pad of the present invention does not rely on deformation alone, but employs an additional feature of impact absorption in that a cushion of open cellular plastic material is incorporated in the pad with a restricted communication with the outside atmosphere, thereby providing a cushioning effect by the principle of relatively slow air release from the material.

Furthermore the open cellular plastic material remains pliant at all temperatures and does not become hard at lowered temperatures, thus assuring protection under all temperature conditions.

The present invention is intended to provide an improvement in that type of protective pad shown in the Reeder patent, and includes a layer of open cell foam plastic material between the outer layer of closed cell material and the rigid core, which open cell layer of material is permitted communication with the outside atmosphere through a restricted passage or hole, whereby air contained in said open cell material, upon pressure being exerted against the pad, is expelled therefrom relatively slowly through said passage, providing a cushioned resiliency to the blow impact, and when the pressure of the impact is relieved, the outside atmosphere is drawn slowly through said restricted passage into the open cellular material to provide a cushioning effect for the next impact blow.

Other and further objects of the invention will become apparent upon reading the detailed specification herein following, and by referring to the drawing annexed hereto.

In the drawing:

FIGURE I is an exploded view showing the separate layers of material making up the protective device;
FIGURE II is a top plan view of one form of the protective pad as it would appear in finished form; and
FIGURE III is a cross-sectional edge view taken along the line III—III of FIG. II.

Numeral references are employed to designate the various elements shown in the drawings, and like numerals indicate like parts throughout the various figures of the drawings.

The numeral 1 indicates a central mounting stiffener, or core, which may be of any desired shape. As shown, it is contoured for a thigh pad to be incorporated as part of a football uniform, and includes a convex portion 2 on the exterior side thereof providing a concave or recessed area 2a on the inner side to space the pad from the leg of the wearer. The stiffener member or core 1 may be made of any relatively stiff, but slightly flexible material, such as a plastic composition or pressed fiber mixed with suitable plastic binder and stiffener formed under pressure and heat. Secured to the outer side of the stiffener 1 is a layer of unicellular, closed cellular foam plastic material 3 or foamed rubber material which is secured to the outer side of the stiffener 1 by means of suitable adhesive (not shown). Preferably a rubber base solvent type adhesive is employed.

The unicellular, closed cell foam material 3 is preferably polyvinyl or neoprene chloride, or polyvinyl acetate sponge material.

To the inner side of the stiffener 1 is secured a layer of foamed plastic open cellular material 4 which is attached to the stiffener or core 1 by means of suitable adhesive of the types indicated. The material 4 may be polyether, polyurethane or polyester foam material. Superposed on the top of the layer of material 4 is another layer of closed cellular foam vinyl plastic material or foam rubber material 5 of the same type as material 3 which is secured to the layer of material 4 by means of suitable adhesive. Preferably the edges of the layers of material 3 and 5 extend beyond the edge of the core 1 and are brought together and secured by suitable adhesive about the edges of the core. The whole assembly is then dipped in, or sprayed with, a liquid plastic material, preferably a vinyl resin coating, which adheres to the surface thereof and sets thereon to provide a waterproof coating 6 about the entire pad assembly. After such treatment a hole or passage 7 is formed through the coating 6 on the inner side of the pad and the layer of material 5 to cause communication between the outside atmosphere and the open cell foam plastic material 4 therein.

It will be seen that when pressure, such as from an impact, is imposed against the protective pad assembly, the air which is in the open cellular material 4 is expelled through the passage 7, but since the passage 7 is relatively small and restricted the air has the tendency to compress within the material 4 as it cannot all escape at once. This, together with the slow reacting closed cellular material provided by the layers 3 and 5, provides a protective pad, which not only absorbs the impact but prevents shock to the wearer and to the other person who may come in contact therewith.

When the shock of impact is relieved from the pad, the vacuum provided in the open cellular material 4 by the dispelling of a portion of air therefrom, causes air to flow back into such material to refill same, similar in function to a hollow rubber ball having a small hole therein.

Thus it will be seen that I have provided a new type of protective pad which provides a better cushioning effect against shock of impact, which has a quick recovery characteristic, and provides an improvement in the type of pad herein described.

It will be understood that other and further forms of the invention may be made without departing from the spirit and scope of the appended claims.

Having described my invention, I claim:

1. A protective device of the class described comprising, a stiffening core; a layer of closed cell foam plastic material secured to one side of the stiffening core; a layer of open cellular plastic material secured to the other side of the stiffening core; a layer of closed cell foam plastic material secured to the other side of the open cellular plastic material; a plastic coating about the foregoing recited assembly; and a passage through the last named closed cellular material and the plastic coating, causing communication between the outside atmosphere and the open cellular material.

2. The combination called for in claim 1 wherein the open cellular material is polyether and closed cellular material is vinyl material.

3. The combination called for in claim 1 wherein the closed cellular material is neoprene.

4. The combination called for in claim 1 wherein the open cellular material is polyurethane and the closed cellular material is vinyl material.

5. The combination called for in claim 1 wherein the open cellular material is polyester material and the closed cellular material is vinyl.

References Cited in the file of this patent
UNITED STATES PATENTS

| | | |
|---|---|---|
| 1,915,753 | Oshea | June 27, 1933 |
| 2,616,093 | Talalay | Nov. 4, 1952 |
| 2,634,415 | Turner et al. | Apr. 14, 1953 |
| 2,785,407 | Reeder | Mar. 19, 1957 |